United States Patent [19]

Jansen

[11] Patent Number: 5,775,260
[45] Date of Patent: Jul. 7, 1998

[54] AQUARIUM EXTENSION

[76] Inventor: John Jansen, 5000 Bishop Lake Rd., #A8, Brighton, Mich. 48116

[21] Appl. No.: 783,484

[22] Filed: Jan. 14, 1997

Related U.S. Application Data

[60] Provisional application No. 60/010,348, Jan. 16, 1996.

[51] Int. Cl.$^6$ .................................................. A01K 1/00
[52] U.S. Cl. ........................... 119/246; 119/255; 119/266
[58] Field of Search .................................. 119/246, 247, 119/255, 266, 267

[56] References Cited

U.S. PATENT DOCUMENTS

| | | |
|---|---|---|
| 2,002,380 | 3/1935 | Wernicke et al. |
| 2,306,027 | 12/1942 | Swaney .................. 119/246 X |
| 2,751,880 | 1/1956 | Markowski . |
| 3,788,781 | 1/1974 | Poulsen .................. 119/246 |
| 3,804,064 | 4/1974 | Kuneman et al. ........ 119/246 |
| 4,176,620 | 12/1979 | Kassos . |
| 4,754,571 | 7/1988 | Riechmann . |
| 4,788,938 | 12/1988 | Davenport . |
| 4,995,334 | 2/1991 | Wechsler . |
| 5,040,489 | 8/1991 | Drake . |
| 5,315,965 | 5/1994 | Davis .................... 119/201 |
| 5,404,840 | 4/1995 | Wiedenmann et al. ..... 119/266 |
| 5,445,112 | 8/1995 | Grosman ................. 119/246 X |

FOREIGN PATENT DOCUMENTS 2856943  11/1979  Germany ..................... 119/266

Primary Examiner—Jeffrey A. Smith
Attorney, Agent, or Firm—Harness, Dickey & Pierce, P.L.C.

[57] ABSTRACT

An enclosure which defines an extension located both immediately above and rearward of an aquarium with a front wall, a rear wall, opposing side walls, a bottom wall, an open top. The enclosure comprising a fame that includes a plurality of support members. Located about the frame members is a screen material or other material which defines the top, front, sides and rear walls of said enclosure. An opening is defined in the enclosure by the support members and the screen material. The opening is horizontally oriented, generally adjacent to the front wall and spaced below the top wall of the enclosure. The frame is adapted to be mounted relative to the aquarium such that the opening is generally coincidental with the open top of the aquarium. A portion of said enclosure is thus located above the aquarium with another portion of the enclosure located above and rearward of the rear wall of the aquarium. In this manner, the enclosure provides an enclosed space that extends both above and rearward of an aquarium so as to enable the healthy confinement of additional, principally land-based animals in a varied environment.

20 Claims, 3 Drawing Sheets

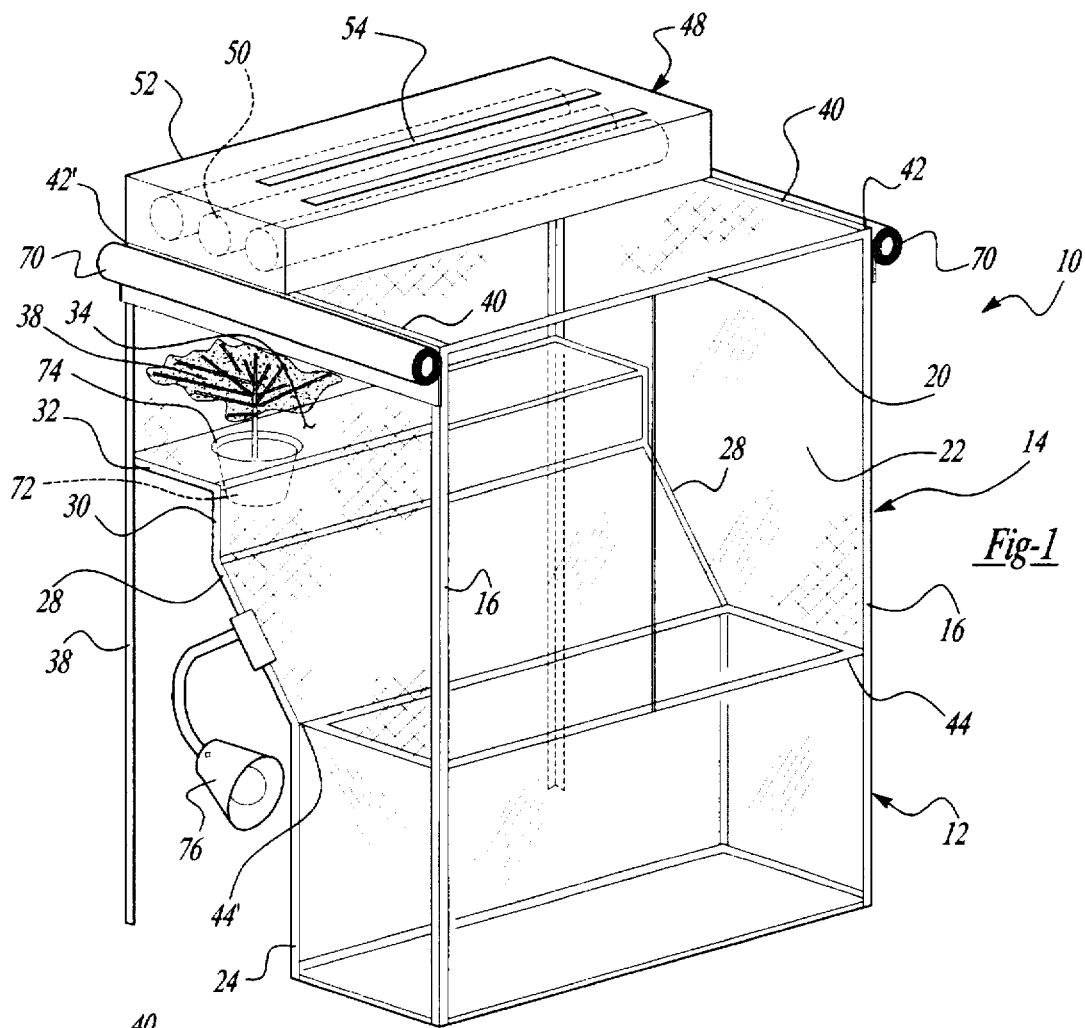
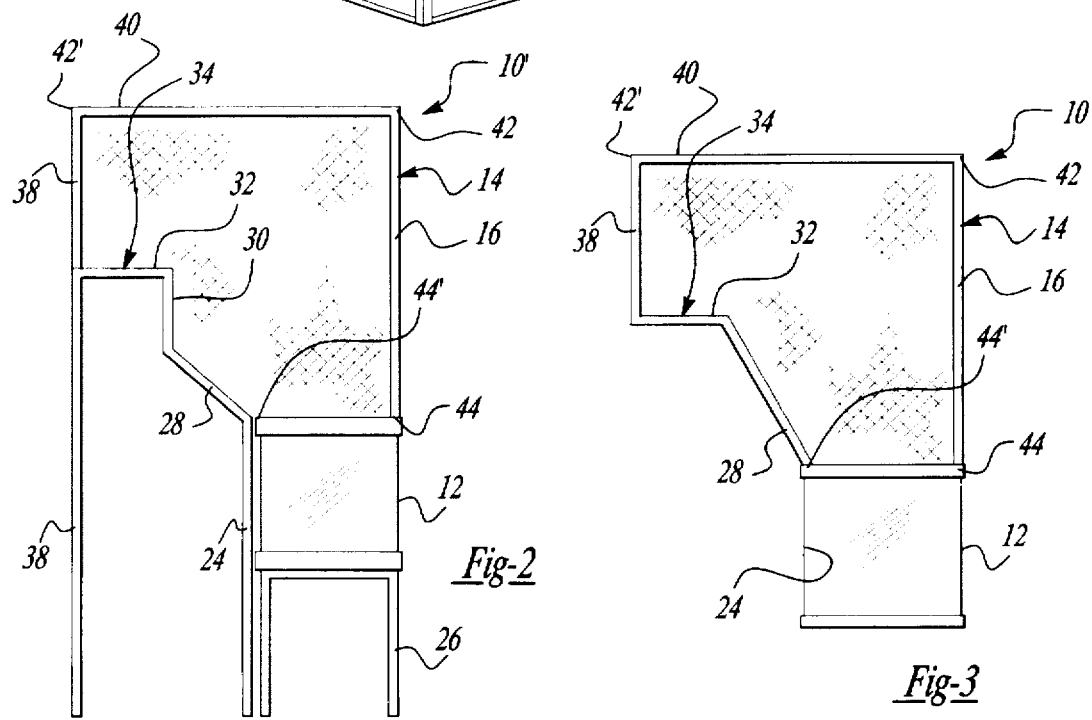
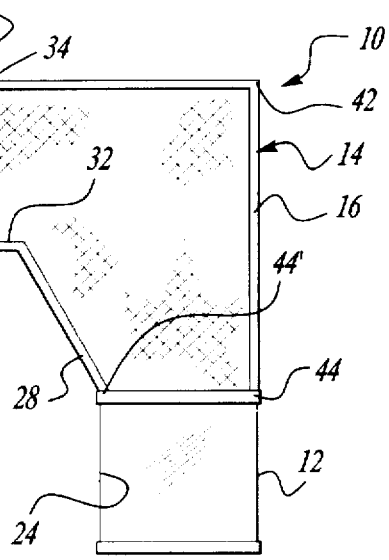

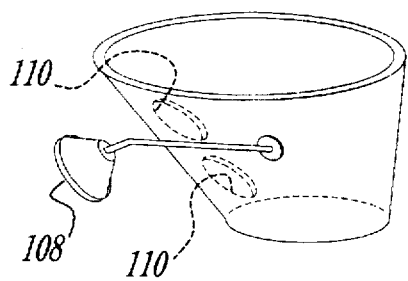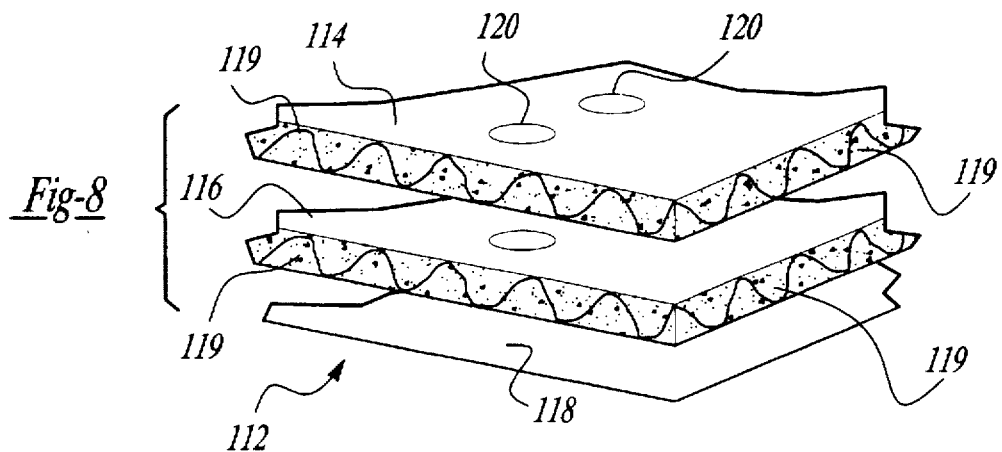

AQUARIUM EXTENSION

CROSS REFERENCE TO RELATED APPLICATION

This application claims the benefit of Provisional Application Ser. No. 601010,348, filed Jan. 16, 1996.

BACKGROUND OF THE INVENTION

1. Field of the Invention

The present invention generally relates to vivarium and more specifically to an upward and rearward extension for use with an aquarium. As such, the present invention forms an upward and rearward enclosed extension off of the aquarium allowing the aquarium to be used to create a vivarium environment where both land based and water based plants and animals can cohabitate and where humid and arid environments can be simultaneously formed.

2. Description of the Prior Art

Aquarium/terrarium combinations, generally referred to herein as vivariums, are generally well known. Examples include U.S. Pat. Nos. 4,176,620 issued to Kassos; 4,754,571 issued to Riechmann; 4,788,938 issued to Davenport; 4,995,334 issued to Wechsler; and 5,040,489 issued to Drake.

In the Kassos patent, the terrarium portion of the tank is disclosed as being formed by the locating of a terrarium floor above the bottom wall and to the side walls of the aquarium tank. The forward edge of the terrarium floor is spaced from the front wall of the aquarium tank to form an opening therebetween allowing access into the body of water in the aquarium and the terrarium portion of the tank.

Riechmann subdivides the interior portions of an aquarium tank into a forward aquarium portion and a rearward terrarium portion. A partition extends the width of the tank and divides the tank into its forward and rearward compartments. By making the partition extend between the ends of the tank, that area in front of the partition can be filled with water to operate as an aquarium and the area behind the partition filled with soil, to act as the terrarium portion.

Davenport discloses a floatable aquarium accessory designed to resemble a natural rocky shoreline setting.

The disclosure of Wechsler is that of an aquarium/terrarium tank which one of the side panels of the aquarium tank is shortened, enabling an over the side filter to operate while permitting a reduced water level within the tank. In this manner, a dry land area can be provided for an animal within the tank while preventing the animal from escaping.

The Drake patent discloses the use of an aquarium in a manner which allows land based plants to be provided in the tank.

Problems with the above type of aquarium/terrarium tanks are that they are quite limited in the types of animals which can be incorporated into the terrarium based portion of the tank. One particular reason for the above problems is that the size of the terrarium portion of the tank is extremely limited and therefore, such land based animals often suffer from severe stress as a result of the containment. Additionally, the above systems reduce the amount of area available for the aquad based animals. Additionally, because of the small relative size of both the terrarium portion and the aquarium portion of these combined tanks, a true diversity of environments purely only exists for two different environments; a land based environment and aquatic based environment. Different variations in the land based environment are not possible.

The present invention has as one of its primary objects allowing a user to select an exotic pet and then create a perfect niche for the pet inside of the vivarium.

It is also an object of the invention to allow for the creation of multiple and differing environments that blend together forming a number of environmental variable combinations.

It is another object of this invention to allow the animals to instinctively find a niche within a multiple environment system.

It is another object of the invention to increase the psychological well being of animals within the vivarium by allowing them to adjust to their niche and be confined there by instinct, thus lowering the stress associated with physical boundaries used in animal confinement.

It is another object of this invention to allow the user to place an animal of which little is known (in terms of habitat requirements) and let the animal find its own niche within the multiple environments of the vivarium.

It is also an object of this invention to increase the diversity of life, and thus increase the chances of survival of any life form dependent on another for survival, inside of the vivarium.

Another object of this invention is to provide an extension which is highly compatible with standard sized (2½–100 gallons and up) and shaped aquariums, and aquarium/terrarium products.

Still another object of the invention is to provide an extension for an aquarium which can be easily and inexpensively mass produced.

Yet another object of the present invention is to provide a mechanism for regulating humidity, moisture and temperature within the vivarium.

Another object Of the invention is to provide a mechanism by which fixtures can be mounted to walls of the extension to support plants or other materials such as food (bird seed, live insects, fruit and others).

Another object of the invention to provide a plurality of removable sections in the shelf that will allow for the insertion of various items such as plant pots and/or special feeders into the shelf itself.

It is an object of the invention to provide a frame that allows for light and heat fixtures to be mounted outside of the extension and aquarium at various positions relative thereto as desired.

SUMMARY OF INVENTION

In accomplishing the above objects, the present invention comprises a frame that extends both vertically and horizontally from the top of an aquarium to form an enclosed extension. The invention principally includes the frame itself, the various materials used to enclose the frame, and other objects used to create the vivarium environment. Depending on the users preferences, the present invention can be adapted for use with various living and non-living materials.

Construction of the present invention generally requires materials which include the following: (1) a material that can act as a frame such as PVC pipe, wood, metal, plastic, molded plastic, or other materials and mechanisms for attaching the frame members to one another; (2) an enclosure material that allows for ventilation such as screen (graphite, aluminum, fiberglass, plastic or other type of screening) cloth, PVC coated chicken wire, PVC coated hardware cloth, or other similar functioning materials that can be fastened to the inside edge of the frame thus creating a medium of enclosure for animals kept in the interior. This material could be replaced with a solid material (that does not allow for ventilation) such as nonperforated plastic, but the user would need to incorporate a fan driven ventilation system; (3) clip lights attach to the frame and are used both for supplemental lighting or environmental (e.g. temperature and humidity) control. The clip lights can support screw-in ceramic heating elements that are currently available in pet stores and, for this reason, a light bulb is not required to fulfill the requirement of environmental control. Also, the clip lights could themselves be replaced with any other number of styles of heat generating attachments; (4) fluorescent light fixture(s); (5) clip on framing or molding to secure the screen to the frame and around the inside top of the aquarium. A variety of adhesives and other methods could also be used. For sturdier materials other than screen, such as hardware cloth or chicken wire, the material may meet flush with the aquarium and be supported by the aquarium frame itself; (6) a piece of glass or Plexiglas or other material to act as both a front door and a transparent enclosure medium. This material could be replaced by any other enclosure medium such as those mentioned above that allow for a viewer to see into the enclosure; (7) materials to attach the front door to the frame such as clips, material fasteners, screws, hinges, and a variety of other materials which would allow it to hingedly open or be completely removed from the frame; (8) while not required for the invention at its most basic level, a waterfall or flood plain greatly increases the overall functionality of the invention by allowing for regulation of the humidity within the enclosure.

Generally the invention is an enclosure defining an extension located both immediately above and rearward of an aquarium having a front wall, a rear wall, opposing side walls, a bottom wall, an open top, said enclosure comprising: a frame including a plurality of support members; wall means about said frame and defining top, front, side and rear walls of said enclosure; an opening in said enclosure defined by said support members and said wall means, said opening being horizontally oriented, generally adjacent to said front wall of said enclosure and spaced below said top wall of said enclosure; means for mounting said frame relative to said aquarium such that said opening is generally coincidental with said open top of said aquarium, a portion of said enclosure being located above said aquarium with another portion of said enclosure located above and rearward of said rear wall of said aquarium; and whereby said enclosure provides an enclosed space extending both above and rearward of said aquarium.

Additional benefits and advantages of the present invention will become apparent to those skilled in the art to which the present invention relates from the subsequent description of the preferred embodiment and the appended claims, taken in conjunction with the accompanying drawings.

BRIEF DESCRIPTION OF THE DRAWINGS

FIG. 1 is a perspective illustration of an enclosure or canopy in combination with an aquarium according to the principles of the present invention;

FIG. 2 is a side elevational view of a second embodiment of the present invention adapted for use and incorporation into an aquarium supported by an aquarium stand;

FIG. 3 is a side elevational view of another embodiment of the present invention particularly adaptive for use with aquariums of a size enabling the enclosure or canopy to be supported by the aquarium itself;

FIG. 7 is a perspective view of a plant pot designed to be mounted to the flood plain; and FIG. 8 is an exploded perspective view of the grow mat.

DESCRIPTION OF PREFERRED EMBODIMENT

Figure 4:
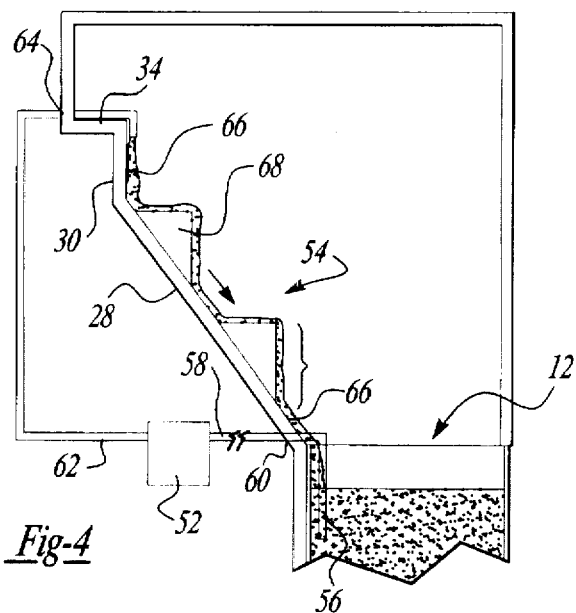
FIG. 4 is a schematic illustration of a waterfall incorporated into the present invention.

Referring now to the drawing, an enclosure or canopy 10 embodying the principles of the present invention is generally illustrated in FIG. 1 in an embodiment adapted for mounting to a floor or table (not shown) supported aquarium 12.

The canopy 10 includes a frame 14 having as seen in the attached drawings, two front frame members 16 are supported by the top front corners 44 of the aquarium 12 and extend vertically upward where they meet with a horizontal member 20, forming a generally rectangular front frame. The bottoms of these frame members 16 are cut-out or otherwise are shaped to facilitate engagement with the aquarium 12 which includes a front wall, a rear wall, opposing side walls, a bottom wall, and an open top. A transparent door 22 of plexiglass or other suitable material is seen attached to the front frame. Outside the rear wall of the aquarium 12, two inner rear frame members 24 extend vertically upward and are located immediately adjacent to the rear side or wall of the aquarium 12 and the stand 26 of the aquarium 12, as seen in FIG. 2. These inner rear frame members 24 extend up from the support on which the aquarium 12 or the stand 24 rests.

At about the top of the aquarium 12, or further there above if desired, the two inner rear frame members 24 are connected to two sloped frame members 28 that angularly extend upward and rearward relative to the top rear edge of the aquarium 12. These sloped members 28 meet with two additional vertical frame members 30 that extend upwardly and generally parallel with the two front frame members 16. The additional vertical frame members 30 are also connected to two rearwardly extending horizontal frame members 32, across which a shelf 34 is supported.

The shelf 34 defines a horizontal surface capable of supporting plants 36 and other vivarium contents, such as small stones, sticks, mosses, waterfalls, animals, and a variety of objects depending on the desires of the user. The shelf 34 is accordingly located both a distance above and a distance behind the opening at the top of the aquarium 12.

From beneath the rear edge of the shelf and connected to the two horizontal members 32 that support the shelf 34, two outer rear frame members 38 extend vertically upward and downward. Below the shelf 34, the two outer rear frame members 38 contact the support surface of the aquarium 12 and above the shelf 34 they join with two top horizontal frame members 40 that extend horizontally forward to the front vertical frame members (discussed above) and help to define the four upper corners 42 and 42' of the frame. The two upper front corners 42 of the frame 14 are thus located a distance above the two front corers 44 of the aquarium 12 and the two upper rear corners 42' of the frame 14 are located a distance above and behind the two rear corners 44' of the aquarium 12.

An enclosure screen 46, made of aluminum, fiberglass, plastic or another material, is attached to the frame 14 so as to enclose the top, rear (including shelf and sloped shelf) and sides of the frame 14 above the aquarium 12. In this manner, a screened in enclosure with a shelf 34 is formed coextensive with and above the aquarium 12 itself. The enclosure acts as an extension above and rearward of the aquarium.

On top of the frame 14, the present invention can be provided with a light fixture assembly 48 consisting of a variety of fluorescent lamps 50. For example, the lamps 50 may include one or more of the following or other types of lamps: a fluorescent grow lamp, a UV light emitting fluorescent lamp, and a cool white fluorescent lamp. The assembly 48 also consists of reflective louvers (not shown) located just below the fluorescent fixtures. The louvers reflect light at a downward angle so as to channel light down onto the contents of the vivarium and not into the eyes of an observer looking into the vivarium. Both the light fixtures and the louvers are capped by a decorative cover 52. The cover 52 includes vents 54 along the top to allow heat to escape from the assembly.

As seen in FIG. 4, a canister type aquarium filter 52 is used to create a water fall 54 that cascades down from the shelf 34 and into the aquarium 12. The intake 56 of the filter 52 is located below the water level inside of the aquarium 12 and water is drawn out of the aquarium 12 through a tube 58 that exits the vivarium enclosure 10 through an aperture 60 in the screen 46 and located above the rear rim of the aquarium 12 and below the sloped portion 28 and shelf 34 of the enclosure 10.

After the water reaches the canister filter 52 (which can rest on the ground, support surface of the aquarium or a lower part of an aquarium stand 26), it is filtered and pumped out of the filter 52 through an exit tube 62 that enters the vivarium through an aperture 64 in the screen located above the shelf 34. The water is channeled by appropriate means so that it flows off of the shelf 34 and onto a water impermeable material 66 attached to the screen 46 extending between the sloped frame members 28 and the vertical frame members 30 converting the sloped members 28 to the shelf 34. The impermeable layer 66 may be of a rigid plastic or of a flexible material so long as it contains the flowing water of the waterfall 54 therein. The water impermeable material 66 extends down from the shelf 34, over the sloped portion 28 and finally into the back of the aquarium 12 where it may be attached to the top of the aquarium 12. This allows water to flow from the shelf 34 into the aquarium 12 without spilling through the screen 46.

Another example of an impermeable layer 66 is herein referred to as a flood plain 98. The flood plain 98 consists of a sheet 100 of water impermeable material. The sheet 100 is molded or otherwise formed to generally conform with the shape of the shelf 34 and the sloped portion 28 and is provided in a width corresponding to the width of the enclosure 10. A peripheral flange 102 is also formed into the sheet 100 to prevent water from spilling off of the bank or sides of the flood plain 98 and out of the enclosure 10. The lowermost end of the sheet 100 can be alternatively formed without any peripheral flange (left side of FIG. 5) so that the water will spill directly into the aquarium 12, can be formed with an angled lip on the lowermost end 104 of the sheet 100 in order to enhance the appearance of the water as it falls off the flood plain 98 and into the aquarium 12, or can be formed with/gutters 105 (right side of FIG. 5) to direct the water to the center of the sheet so as to prevent it from falling on any land masses located within the aquarium 12.

Figure 5:
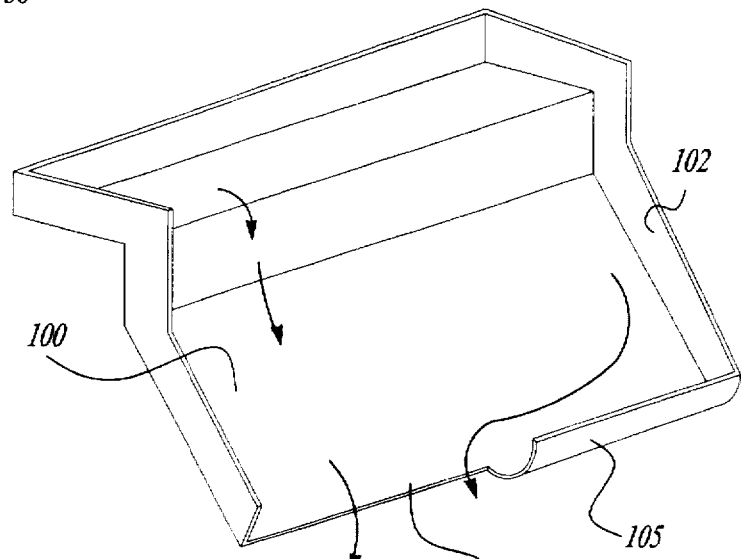
FIG. 5 is a perspective view of the flood plain.
Figure 6:
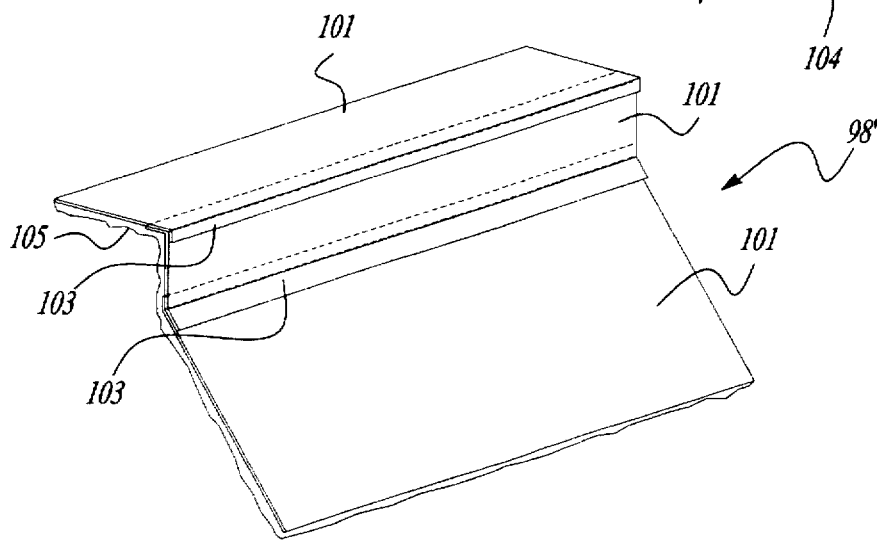
FIG. 6 is a perspective view of another embodiment of the flood plain.

The flood plain 98 can be constructed from a single unitary sheet 100 of appropriate material, such as plexiglass (see FIG. 5). Alternatively, (see FIG. 6) the flood plain 98' is constructed from multiple rectangular, planar sheets 101 (forming the flat surfaces of the flood plain 98') with smaller sheets of flexible plastic film 103 lapped or shingled over the planar sheets at the angular transitions from the shelf 34 to the sloped portion 28 (and at any other appropriate angular transitions) to permit water flow down the flood plain 98' without leakage. Peripheral flanges 102 would obviously be provided on this latter constructions and, if desired, a sheet 107 of impermeable plastic film could be incorporated beneath the entire length and width of the flood plain 98'.

Plant pot 106 can be adhered to the flood plain 98 via suction cups 108 connected to the pots 106 by wire or plastic supports 109 or other suitable means at any desired location. By locating openings 110 in the pots 106 so that they are adjacent to the flood plain 98, plants located in the pots 106 are self-watering as a result of the water flowing down the flood plain 98. If desired, sides of the pots 106 can be formed on one side 111 at an angle specifically designed to hold the top of the pot 106 horizontally when mounted to the flood plain 98 at a specific location, such as on the sloped portion 28.

To provide additional plants (such as moss, lichens, algae, fungi, and others) in the flood plain 98, a plant grow mat 112 can be located over the entire flood plain 98, also allowing for the plants to be watered by the action of the water to be flowing down the flood plain 98. Generally, the grow mat 112 is comprised of three layers. The top layer 114 is of a moisture permeable material, such as cheesecloth. An intermediate layer 116 is of a known growing medium (such as peat moss or an artificial growing medium). The bottom layer 118 is of either a moisture permeable (as mentioned above) or impermeable (plastic film) material. Located in either the top, intermediate or both layers 114, 116, are seed and spores (generally designated at 119) which upon incorporation of the mat 112 into the enclosure 10 will germinate providing a lush carpet of living plants and other organisms. Holes 120 can be cut into the mat 112 to allow for the mounting of pots 106 to the flood plain 98.

A variety of attachments can be secured to the impermeable material 66 altering the flow of water in an aesthetically pleasing way and concealing the impermeable layer material 66 from view. One attachment may consist of a container 68 that forms a small pool that is aerated with an air pump, hoses, and air stones (not shown) creating the effect of highly agitated water both in the pools and as water flows out of the pools continuing its path downward. This highly agitated effect mimics the appearance of white foam that occurs in natural waterfalls and considerably enhances the aesthetic as well as realistic appearance of the waterfall 54. It also substantially increases humidity within the enclosure 10 and can be used as an additional environmental regulation tool.

Various small fixtures can be attached to the screen 46. The fixtures may include containers capable of holding small plant pots covered with natural materials (such as dried moss, bark, gavel, stones, sticks or other aesthetically appropriate materials) that are glued or placed upon the fixture to form a natural looking setting for a pot holder or a feeder within the vivarium. One method of securing the fixtures in place include use of hook and loop fastening material for easy removal during cleaning or rearranging. Dried mosses can be used as a general background filler and trim and double sided tape can be used to secure the dried moss.

The inside of the aquarium 12 itself can be decorated as desired. For example, two plastic containers filled with potting soil can be placed in the rear corners of the aquarium and are adhered in place with silicone adhesive. The containers themselves can be covered with natural aquarium gravel (glued into place with a non toxic non-water soluble adhesive) and the aquarium 12 filled with water to a level just below the top of the plastic containers so that water does not overflow into the containers. The overall appearance is that of two land masses with an area of water between them and also an area of water in front of them between the front glass of the aquarium 12 and the land masses. Gravel is also placed freely along the bottom of the aquarium surrounding the land masses. This is done not only for esthetic purposes, but also to create the natural biological medium of aquariums 12 in which bacteria can breakdown animal excrement and to facilitate incorporation of traditional three step mechanical and biological filtration systems. With the traditional filtration system and the grow mat 112, the system is substantially self-cleaning, at least for small animals. For example, a spray bottle with water can be used to spray animal droppings thereby washing them into the grow mat 112. Because the design of the flood plain allows water to continuously filter through the mat 112, plants in the mat 112 remove nutrients and naturally filter the water as it slowly trickles through the mat 112.

Placed along the outer edges of the upper horizontal frame members 40 along both the rear and sides are roll down sheet members or roller shade 70, similar to a window roller shade. These roller shade members 70 allow heat and humidity to be vented or be contained within the enclosure in varying degrees. By rolling down shades 70 completely, partially, or not at all, control over the relative heat and humidity of the enclosure with respect to the outer environment (a person's house or place of business) is easily maintained as desired.

The frame 14 and shelf 34 are used to support various materials (including plants, animals, fungi, sea shells, rocks, gravel, sticks or wood in the form of logs, artificial plants and objects, containers with soil, sand or other substrates, containers with water, waterfalls, drip emitters, heat sources, light sources such as fluorescent lamps including grow lights and UV emitting florescents such as those commonly used for reptiles, fans, environmental control regulators such as rain simulators, light reflectors/louvers, thermometers, thermostats and humidistats, artificial or molded landscape decorations, and many other vivarium accessories available to the user) used in creating a vivarium that is readily adaptable and flexible to the user's needs.

For example, a plant pot 72 can be sunk into an aperture 74 defined in the shelf 34 so that the upper rim of the pot is larger than the aperture and keeps the pot from falling through, yet the majority of the pot is sunk below the level of the shelf 34 creating the illusion that the plant 36 is growing out of the shelf 34 and not in a pot 72 at all. This illusion is further satisfied when the area beneath the plant 36 is covered with moss or another decorative substrate. These apertures 74 can also be filled with a container that holds bird seed at the bottom. This forces a bird to fly down into a pit to eat seed. Since the bird eats in the pit, it does not spill bird seed all over the tank, all the seeds it spills stays inside the pit below the shelf. The pit can be removed for cleaning. These same apertures 74 may be used for a variety of attachments linking the inside of the vivarium with another enclosure allowing animals to travel between a plurality of animal enclosures.

The needs of the life forms chosen by the user to be placed in the present invention 10 are partial determinants to how the user will organize the contents of the vivarium and attachments to the frame 14. It is believed that most users will take advantage of this invention to create a multiple of different habitats within the vivarium. Most small birds, reptiles amphibians, fish and plants will thrive in a general multi-environment setup allowing the user to keep a large variety of living things with very different habitat needs in a relatively small enclosure 10. For example, worms burrowing in the soil of the potted plants in the vivarium increase aeration to the roots of plants allowing some plants to survive in areas that may be too moist otherwise (because of root rot from lack of aeration which happens when the soil is too moist and compact relative to the plants needs). The key element of the present design is that it gives the user unprecedented flexibility in combining different habitats in such a small enclosure 10. Importantly, a user that already possesses an aquarium 12 and related accessories can convert the aquarium 12 into a vivarium and use most of the standard aquarium accessories that the user already possesses.

This flexibility is extremely valuable because each user has different preferences for plants and animals in a vivarium. If, for example, a user decided to keep turtles and a Jackson's chameleon together in a vivarium, there are a number of environmental combinations and materials that would be needed. Some special needs and characteristics of these animals follow: Jackson's chameleons require good ventilation but their feet are damaged by normal screening material, so the user is recommended to select PVC coated chicken wire as an enclosure medium for the frame. Since a Jackson's chameleon can not recognize standing water, a waterfall or drip emitter would also be recommended so the animal can drink. The chameleon also requires plants to crawl on for a stress reduced environment (stress is the number one killer of exotic animals in captivity). This is a problem because turtles will almost always destroy any plants in the vivarium. Both turtles and the Jackson's chameleon require a basking light simulating the sun. In this case, the solution for the user would place a number of plants and climbing sticks on the shelf 34 for the chameleon. The shelf 34 is substantially above the lower portion of the vivarium that the turtles can not crawl up to destroy the plants (however if the user had not chosen turtles, he/she could have readily created a walkway from the lower portion to the shelf in a variety of ways). Next, the user could place a light fixture (not shown) on the frame 14, using a light having an integral clip (a "clip light"), in a position that allows light and radiant heat to pass through the screen 46 and onto a stick or branch located on the shelf 34. This would satisfy the chameleon's basking needs. Then the user would place another clip light on one of the inner rear frame members 16 and aim the light through the aquarium glass on a dry area above the water level. This would provide the turtles with a crawl out area for basking. A vertically placed stick in the lower aquarium 12 of the vivarium would link the aquarium 12 to the upper shelf 34 so the chameleons would not get trapped in the lower portion. The stick would not be a sufficient walkway for turtles.

The above case illustrates the advantages and flexibility that are inherent in this invention 10. It gives the user a general map to create multiple habitats, yet allows for flexibility to meet the needs of specific animals and combinations of specific animals. The user also has greater flexibility to create an aesthetically appealing landscape that functions for the life within.

The present invention allows the "clip" lights mentioned above to be attached almost any where along the frame 14 of the enclosure 10 giving the user unprecedented flexibility in both the placement of heat sources and placement of supplemental lighting. Since the screen or other enclosure materials 46 allow ventilation and are attached along the inside of the frame, the clip lights are capable of being adjustably attached directly to the exposed outer edge of the frame. In this manner, the user not only has tremendous flexibility in the placement of heat sources, he/she can also control the amount of heat radiated on any particular object of the vivarium's interior. This is done by locating the light closer to or farther from the target area. A "goose necked" clip light is preferred for these reasons and one is seen in FIG. 1 and designated at 76. The heat and light penetrate through the screen 46, allowing for ventilation, and through the glass of the aquarium 12.

The clip lights also influence the relative moisture content of the target area. By evaporating moisture from the target area, a variety of environmental results, depending on the target area's proximity to moisture sources inside of the vivarium (waterfalls, pools of water, chronically saturated soil, aquarium water level or any other source of moisture the user implements) and the composition of objects in the target area, can be generated. In general, placing a clip light near a chronically moist area will increase humidity in a localized area creating a humidity gradient extending outward and upward from the target area. In general, targeting an area farther away from a chronically moist area will evaporate the moisture out of the target area creating a localized arid region and a similar arid gradient radiating outward and upward from the targeted area.

The above are only generalizations because the composition of the targeted object or area affects the result (in substantially predictable and beneficial ways). For example, suppose the user wants to create a dry warm highly illuminated area close to the water level for the purpose of providing a basking site for turtles who in the wild crawl out and dry their shells in the "sun" only inches above water level, such as in a lake or pond. Such an area is easily mimicked with the present invention 10 by placing a rock near a point where the water level meets the vivarium land mass and taking care to select a point not splashed directly by the waterfall. A clip light will heat the rock (which absorbs and stores heat and contains virtually no moisture) evaporating the water from the surface of the rock and lowering the relative humidity in a localized area above the rock creating the perfect basking sight for the turtle to keep its shell dry and healthy. Even though the target area is close to water, the target area stays dry in this situation because of the natural physical properties of the rock, high heat retention and low moisture content. While this particular environment has been mimicked in standard aquariums 12, without ventilated sides and the frame 14 for supporting the clip lights 76, the vertical rise of the aquarium 12 above the water line is minimal and/or the heat light is located too far away from the rock to produce the effect. This is because standard aquariums 12 with their covers can only support heat lights from the top. It is not safe for the user, or the animals, to place an electric light inside the enclosure. Not only does this pose an electrical hazard, but the temperature of the light and reflector would surely burn any animal that came in contact with it. This in turn would seriously limit the variety of animals that this setup could sustain. Also, electric "hot rocks" can electrocute animals if placed in a moist environment. The present set up can not take advantage of all the benefits associated with the relevant invention.

A general moisture gradient exists around the path of a waterfall 54. Another general moisture gradient starts at the water level inside of the aquarium 12 and decreases slightly as one progresses away from the water level. The greatest change in the general moisture gradients in the present invention occurs at the top of the aquarium 12 where it meets the frame 14 of the enclosure 10. This is because the frame 14 supports materials that allow for ventilation and the aquarium 12 is composed of four moisture impermeable walls of glass. The combination of the frame 14 and the aquarium 12 allows for both moisture retention and moisture evaporation. The ventilation provided in this system also allows for heat to escape. Thus, clip light 76 heat sources, as provided with the present invention, work on a localized level and do not significantly alter the temperature within the entire vivarium, only the targeted area is significantly heated.

With the localized control of the present invention, many combinations of temperature, light, and moisture are possible so that the environmental needs of a wider variety of life forms can be successfully maintained together inside a single enclosure 10. Some of the environmental niches present in the preferred embodiment are: warm, moist and shady; warm, moist with bright light; cool, moist and shady; cool, moist with bright light; warm, dry and shady; warm, dry with bright light; cool, dry and shady; cool, dry with bright light; underwater and shady; and underwater with bright light. Also waterfall pools can be heated from below the shelf 34, the sloped portion 28, or behind the two areas on either side of the sloped portion 28. If the pools are constructed of a plastic container with flat river type stones glued over the container (a decorative touch that completely hides the container), then the rocks retain heat and the pool water is warmed as it enters from the waterfall 54 above. As the water flows down over open areas and into other pools it is cooled and finally reaches the aquarium 12 where the temperature is considerably lower. Accordingly, another series of environmental combinations is possible via underwater control, further increasing the diversity of species capable of being kept in the vivarium.

A fan may be required for an animal or plant in the vivarium. Some plants grow poorly without wind to flush new air into the micro environment made up of tiny hair like extremities that cover the leaf. Also, some plants will not grow a strong stem if the plant is not blown by the wind periodically from side to side. Many reptiles need a considerably lower temperature at night. For example, the fan can be aimed at the waterfall 54 and set on a timer to turn on at night. By aiming a fan, with an integral clip for attaching to the frame 14, on various parts of the interior, temperature and humidity can further be regulated. This considerably lowers the temperature of the vivarium meeting the needs of these reptiles without having to adjust the temperature of the room in which the vivarium is located. A larger temperature change can occur if the user takes advantage of the roll down shades 70 during the day cycle (when the heat lights are on) and then rolls them completely up at night exposing the interior to greater ventilation thus removing heat that has built up throughout the day. It is the fluctuation itself, and not some predetermined low temperature that some reptiles need. If these reptiles do not receive a night time temperature drop on a regular basis they will not remain healthy and will likely die.

An embodiment with multiple horizontal shelves 34 is also capable of successfully combining both fresh and salt water environments within the same vivarium. The salt water portion would be located in the aquarium 12 at the bottom and the fresh water portion would be comprised of a container that holds fresh water on a first shelf located above the salt water aquarium. A waterfall 54 would start on a second shelf, above the first shelf, and flow down to the container located on the first shelf.

A further embodiment of the present invention, adapted for smaller aquariums 12 and is supported by locating rear frame members 24 of the frame 14 within the aquarium 12 seen in FIG. 3. In that many elements of this third embodiment are common to the previously discussed embodiments, like elements are being designated with like item numbers.

While the above description constitutes the preferred embodiment of the present invention, it will be appreciated that the invention is susceptible to modification, variation and change without departing from the proper scope and fair meaning of the accompanying claims.

I claim:

1. An enclosure extension for an aquarium, the aquarium having a front wall, a rear wall, opposing side wall for contacting and extending up from a support surface an open top, said enclosure extension comprising:

a frame for at least partially supporting said enclosure extension above said support surface, said frame including a plurality of support members, at least some of said support members contacting and extending up from the support surface;

wall means secured to said frame and supported thereby, said wall means defining top, front, side and rear walls of said enclosure;

a bottom opening into said enclosure and being defined by said support members and said wall means, said bottom opening being horizontally oriented and spaced above where said support members contact the support surface, said bottom opening also being generally adjacent to said front wall of said enclosure and spaced below said top wall of said enclosure;

means for mounting said frame relative to the aquarium such that said bottom opening is generally coincidental with the open top of the aquarium, a portion of said enclosure being located above said bottom opening with another portion of said enclosure located above and rearward of said bottom opening; and whereby said enclosure provides an enclosed space extending both above and rearward of said bottom opening and the aquarium.

2. The apparatus according to claim 1 wherein said frame includes portions for defining a horizontal shelf within said enclosure.

3. The apparatus according to claim 2 wherein said portions defining said shelf are located above said bottom opening and to a side of said bottom opening opposite said front wall.

4. The apparatus according to claim 2 wherein said frame includes portions defining a sloped portion within said enclosure.

5. The apparatus according to claim 4 wherein said sloped portion extends from said portions defining said shelf to said bottom opening.

6. The apparatus according to claim 1 wherein said frame includes portions defining a sloped portion within said enclosure.

7. The apparatus according to claim 6 wherein said sloped portion extends upward from said bottom opening and away from said front wall.

8. The apparatus according to claim 1 wherein said frame is adapted to engage a portion of the aquarium.

9. The apparatus according to claim 8 wherein said frame is adapted to engage a portion of an upper periphery of the aquarium.

10. The apparatus according to claim 8 wherein said frame is adapted to extend interiorly of the aquarium.

11. The apparatus according to claim 1 wherein said wall means is a screen material.

12. The apparatus according to claim 1 further comprising humidity means for creating varied zones of humidity within said enclosure.

13. The apparatus according to claim 12 wherein said humidity means includes a water source and a heat source, said heat source being adjustable with respect to said water source.

14. The apparatus according to claim 13 wherein said heat source is a light.

15. The apparatus according to claim 14 wherein said light is adjustably positionable along said frame.

16. The apparatus according to claim 13 wherein said water source includes a source of flowing water and means for directing said flowing water.

17. The apparatus according to claim 16 wherein means for directing said flowing later channels said flowing water from said shelf to said bottom opening.

18. The apparatus according to claim 16 wherein said enclosure defines a first width and said means for directing said flowing water is of a width generally equal to said said first width.

19. The apparatus according to claim 16 wherein said enclosure defines a first width and said means for directing said flowing water is of a width less than said said first width.

20. The apparatus according to claim 13 wherein said humidity means includes solid wall means for covering said screening means.

* * * * *

UNITED STATES PATENT AND TRADEMARK OFFICE
CERTIFICATE OF CORRECTION

PATENT NO. : 5,775,260
DATED : July 7, 1998
INVENTOR(S) : John Jansen

It is certified that error appears in the above-indentified patent and that said Letters Patent is hereby corrected as shown below:

In column 1 line 6, after 60, delete "1" (1st occurrence) and insert --/--.

In column 2 line 36, after object, delete "Of" and insert --of--.

In column 9 line 59, after surely, delete "bum" and insert --burn--.

In column 11 line 16, Claim 1, after side, delete "wall" and insert --walls--.

In column 12 line 36, Claim 17, after flowing, delete "later" and insert --water--.

In column 12 line 44, Claim 19, after less than, delete the first occurrence of "said".

Signed and Sealed this

Nineteenth Day of January, 1999

Attest:

Attesting Officer

*Acting Commissioner of Patents and Trademarks*